United States Patent [19]

Baillie-Hamilton et al.

[11] Patent Number: 4,951,076
[45] Date of Patent: Aug. 21, 1990

[54] PHOTOGRAPHIC COVE

[75] Inventors: William J. Baillie-Hamilton, Wargrave; Ronald J. Brown, Ascot, both of Great Britain

[73] Assignee: J R Group PLC, Reading, Great Britain

[21] Appl. No.: 250,679
[22] PCT Filed: Mar. 6, 1987
[86] PCT No.: PCT/GB87/00161
 § 371 Date: Sep. 1, 1988
 § 102(e) Date: Sep. 1, 1988
[87] PCT Pub. No.: WO87/05407
 PCT Pub. Date: Sep. 11, 1987

[30] Foreign Application Priority Data
 Mar. 7, 1986 [GB] United Kingdom ............... 8605737

[51] Int. Cl.⁵ .................... G03B 15/06; E04B 1/60
[52] U.S. Cl. .................... 354/291; 352/88; 52/585
[58] Field of Search ............. 354/290, 291; 352/48, 352/88, 89; 350/125; 52/287, 288, 242, 585, 586

[56] References Cited
U.S. PATENT DOCUMENTS

| 4,067,165 | 1/1978 | Timmons | 52/585 |
| 4,144,556 | 3/1979 | Bond . | |
| 4,183,185 | 1/1980 | Farge | 52/287 |
| 4,292,662 | 9/1981 | Gasperini . | |
| 4,318,589 | 3/1982 | Brown et al. | 350/125 |
| 4,750,807 | 6/1988 | Felix | 350/125 |

FOREIGN PATENT DOCUMENTS

| 1397861 | 3/1965 | France . |
| 2044606 | 2/1971 | France . |
| 2097564 | 3/1972 | France . |
| 2355136 | 1/1978 | France . |
| 2561791 | 9/1985 | France . |
| 310448 | 10/1955 | Italy . |

Primary Examiner—A. A. Mathews
Attorney, Agent, or Firm—Finnegan, Henderson, Farabow, Garrett & Dunner

[57] ABSTRACT

A photographic cove for use in photographic studios and the like comprises a plurality of portable pre-fabricated modular units (1) each having a front surface (2), which in some units is concave, and mating side surfaces (3). The units (1) are releasably secured together by means (7, 8 or 10, 11). Means (5, 14 or 20) support the assembled cove.

11 Claims, 3 Drawing Sheets

PHOTOGRAPHIC COVE

This invention relates to photographic coves.

Photograhpic coves are used in photography, cinematography, television, video and other applications when an apparently featureless background with no angles or edges is required. Such coves are usually hand-built on site, as a single unit, of plaster or similar inflexible material supported by a wooden frame, and cannot economically be dismantled for re-use on new sites. Hence they are usually regarded as permanent fixtures.

Construction of such coves is both time consuming and costly, requiring great skill to achieve a uniformity that is professionally acceptable. Alterations or additions are expensive because of the nature of the materials used. Traditional photographic coves are also susceptible to damage by atmospheric conditions, such as humidity, and have a tendency to crack when subjected to intense heat from photographic or other lighting equipment. Furthermore because of their cumbersome nature they require permanent siting, and when not in use occupy extensive floor and wall space.

The object of the present invention is to provide a photographic cove which overcomes the disadvantages of the known coves.

The present invention provides a photographic cove comprising a plurality of stackable pre-fabricated modular units each of which has a front surface, the front surface of at least one unit being concave, the units being securable one to another so that the front surfaces thereof combine to form a smooth at least partially concave surface, wherein the units have rearwardly extending peripheral flanges providing mating side surfaces, means extend into or through at least some of said flanges to releasably secure the units one to another and means are provided secured to said flanges for supporting the assembled units.

The invention allows an assembled cove to be disassembled for ease of transportation to another site. When not in use, the disassembled cove units may be stacked out of the way in the studio or stored elsewhere, so as to make economic use of floor space. A cove embodying the invention is relatively easy for a non-expert to assemble and dismantle.

The units are of strong and lightweight self-supporting structure, and may suitably be made e.g., moulded, from glass fibre reinforced plastics, blow-moulded plastics, or other lightweight material. Preferred embodiments of the invention will be described with reference to the accompanying drawings in which.

Figure 1:
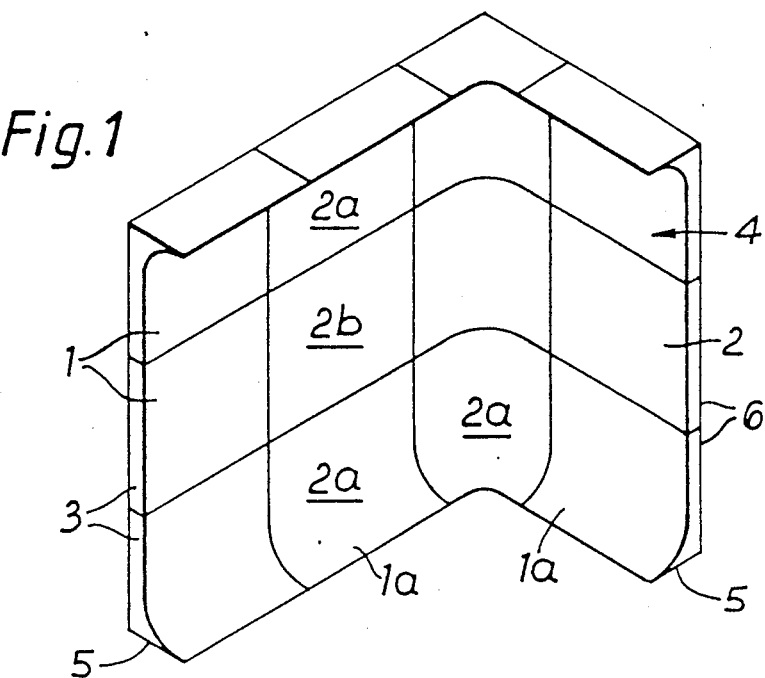
FIG. 1 is a perspective view of one embodiment of a photographic cove embodying the invention.
Figure 2:
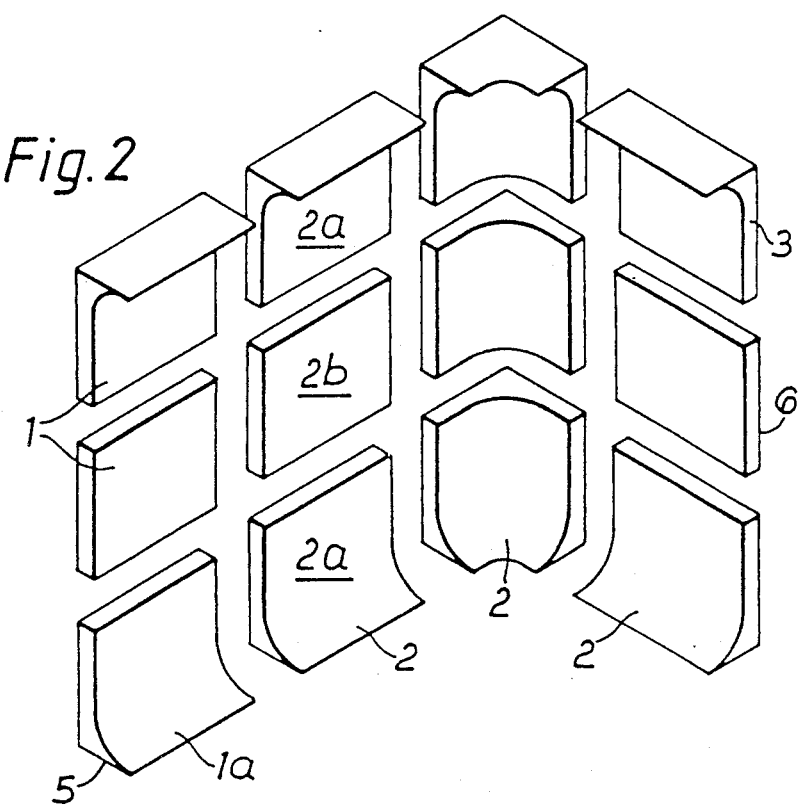
FIG. 2 is an exploded view of the cove of FIG. 1.

Referring to FIGS. 1 and 2, the photographic cove is assembled from a plurality of prefabricated modular units 1 of predetermined width and height, each unit having a front surface 2 and side surfaces 3 which abut in the assembled cove. The front surfaces 2a of some of the units 1 are concave and the front surfaces 2b of others of the units 1 are planar. The front surfaces 2 of the units 1 combine to provide a smooth at least partially concave surface 4 as shown in FIG. 1.

The base units 1a have a bottom wall 5 which acts as a support for supporting the assembled cove.

For lightness and ease of construction the side surfaces 3 are provided by rearwardly extending peripheral flanges 6 so that from the rear each unit 1 is of an open box-like construction.

Figure 3:
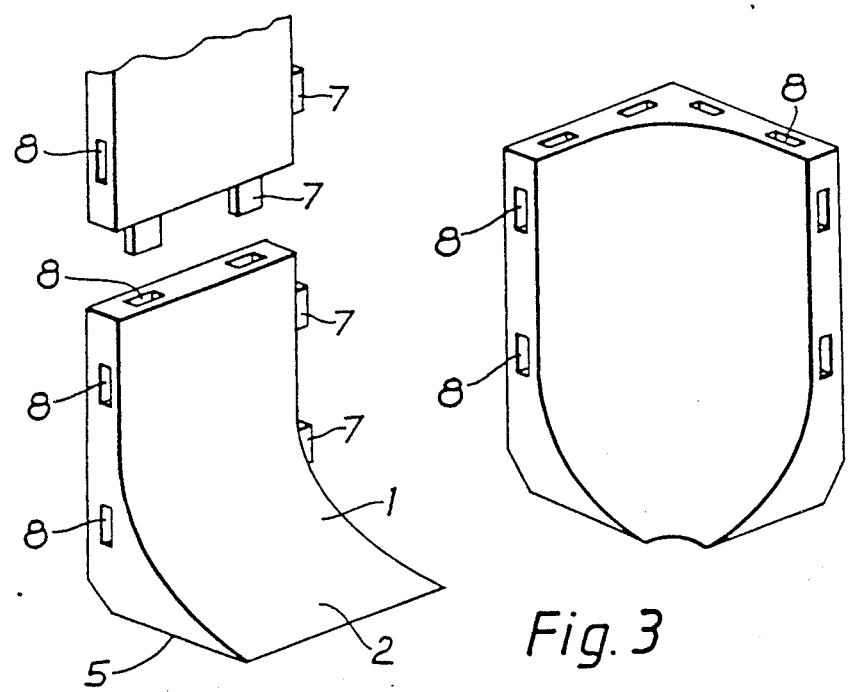
FIG. 3 is a perspective view of two base units and one middle unit of a photographic cove showing one method of securing the units.
Figure 4:
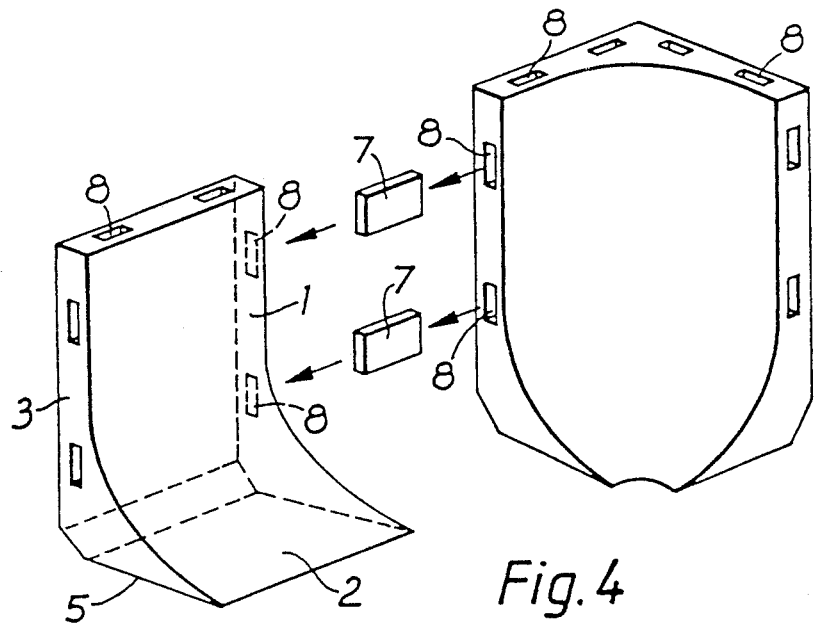
FIG. 4 is a perspective view of two base units of a photographic cove showing another method of securing the units.

As shown in FIGS. 3 and 4 the units 1 may be connected together by means of pegs or dowels 7 which engage in apertures or recesses 8 in the side surfaces 3. Pegs or dowels 7 may be either integral with the units 1 as shown in FIG. 3 or separate therefrom as shown in FIG. 4. Whilst pegs or dowels 7 and apertures or recesses 8 are preferably rectangular as shown they may be of any other cross-section such as round, oval or polygonal.

Figure 5:
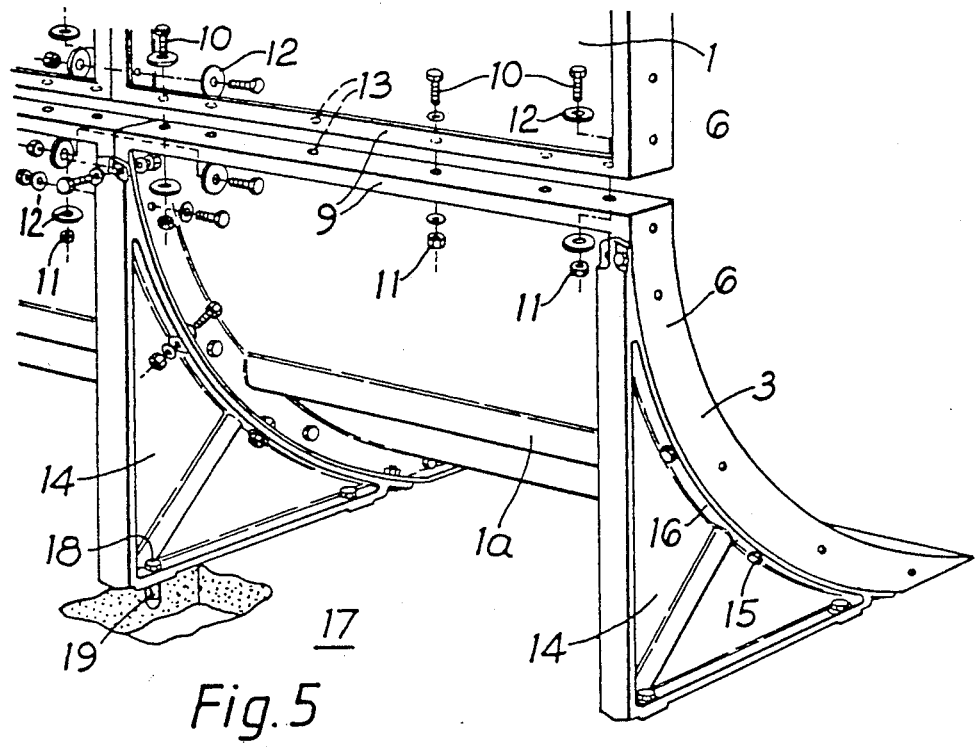
FIG. 5 is a fragmentary rear prespective view of another embodiment of a photographic cove according to the invention.

In the embodiment shown in FIG. 5, in which like parts have been given like reference numerals, the peripheral flanges 6 of each unit 1 extend rearwardly to provide side surfaces 3 and then inwardly substantially parallel to the front surface 2 to impart greater rigidity to the unit 1 and to provide rear flange portions 9. The units 1 are secured together by bolts 10 and nuts 11, with the interposition of washers 12, the bolts 10 extending through mating apertures 13 in flanges 6.

The assembled cove is supported on legs or feet 14 releasably secured to the base units 1a by means of bolts 15 which pass through peripheral flanges 16 of the legs or feet 14 and through the flange portions 9 of the units 1a. The legs or feet 14 can be secured to a floor or like surface 17 as by means of bolts 18 and plugs 19.

Figure 6:
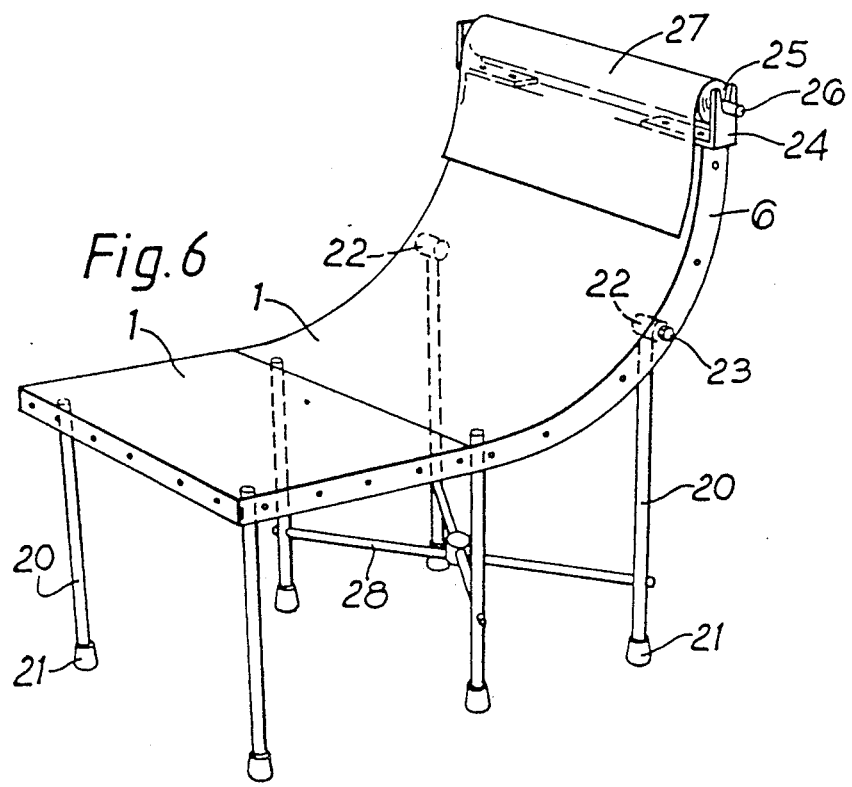
FIG. 6 is a prespective view of a further embodiment of a photographic cove according to the invention.

The top and bottom units 1 of the assembled cove can be identical so that a complete cove can be assembled from only four different types of unit, namely a base or top unit, a base or top corner unit, a planar intermediate unit and a corner intermediate unit. FIG. 6 shows a small portable photographic cove, e.g., for supporting and photographing small articles. Again like reference numerals have been used to indicate like parts. The cove illustrated comprises two units 1 secured, e.g., bolted, together and supported on tubular legs 20 provided at their lower ends with rubber or plastics feet 21. The legs 20 have tubular nuts 22 secured, e.g., welded, to the tops thereof and are secured to the flanges 6 by bolts 23 which extend through the flanges 6 and thread into the nuts 22. Brackets 24 are bolted to the top of the cove and have slots 25 therein for receiving a spindle 26 on which is supported a roll of backing paper 27 which can be pulled down over the front surface 4 of the cove. The legs 20 are braced by stays 28 which extend therebetween.

The assembled cove may be secured to an existing wall by brackets and/or screws, bolts or other suitable fastenings, to provide extra stability and rigidity if required.

In a further modification, one or more wheels may be attached to the units to allow the assembled cove structure to be moved or powered by mechanical, electrical or other means to the required position in an area, and lowered to meet the ground. The direction and speed of travel and lowering and raising of the units may be controlled by remote control, using infra-red, radio control, ultra-sonic, fibre optic or other suitable means.

Photographic equipment such as lighting may be attached to the sides or top of the cove by means of slots, pegs, screws, bolts, bracket or other fastenings.

Cove units may be assembled to provide a room that is substantially featureless. Access to the room may be provided by means of a hinged cove section, which may be opened upwards or sideways to provide an entrance to the room. Alternatively, cove units may be provided with releaseable fastenings, such as sliding hinges, which allow a unit to be slid out of position or removed whilst the assembled cove is in situ, thereby allowing access from one side of the structure to the other.

Assembled coves may be painted and any visible gaps between units filled with a filler or other permanent or temporary material so as to further enhance the featureless appearance, according to individual specification and requirements.

We claim:

1. A photographic cove comprising a plurality of stackable pre-fabricated modular units each of which has a front surface, the front surface of at least one unit being concave, the units being secured one to another so that the front surfaces thereof combine to form a smooth at least partially concave surface, the units each having an integral rearwardly extending peripheral flange providing at least one mating side surface, said peripheral flange extending first rearwardly of said front surface to provide said at least one side surface and then inwardly substantially parallel to said front surface to impart additional rigidity to the unit, securing means extending into at least some of said flanges to releasably secure the units one to another and support means secured to said flanges for supporting the assembled units.

2. A photographic cove according to claim 1, wherein the photographic cove is free-standing.

3. A photographic cove according to claim 1, wherein each said unit is molded from plastics material.

4. A photographic cove according to claim 3, wherein said plastics material is glass-fiber reinforced.

5. A photographic cove according to claim 1, wherein said securing means comprises nuts an bolts.

6. A photographic cove according to claim 1, wherein said supporting means comprises at least one foot or leg member secured to at least one said unit.

7. A photographic cove according to claim 6, wherein said at least one foot or leg member is securable by fastening means to said rearwardly or inwardly directed portion of said peripheral flange.

8. A photographic cove according to claim 7, wherein said fastening means includes bolts.

9. A photographic cove according to claim 1, in which the assembled cove is secured to an existing wall and/or floor for extra stability.

10. A photographic cove according to claim 1, wherein a featureless appearance of the cove is produced by the application of covering material to said at least partially concave surface.

11. A free-standing photographic cove comprising a plurality of stackable prefabricated modular units each of which has a front surface, the front surface of at least one unit being concave, the units being secured one to another so that the front surfaces thereof combine to form a smooth at least partially concave surface, the units each having an integral rearwardly extending peripheral flange providing at least one mating side surface which abuts the corresponding mating side surface of adjacent unit, said peripheral flange extending first rearwardly of said front surface to provide said at least one mating side surface and then inwardly substantially parallel to said front surface to impart additional rigidity to the unit, securing means extending through at least some of said flanges to releasably secure the units one to another, and leg members for supporting said units, said leg members comprising a ground engaging surface and a surface which conforms to and engages rearwardly directed surfaces of inwardly directed flange portions of two adjacent units, each leg member being releasably secured to said inwardly directed flange portions.

* * * * *